United States Patent
Chen et al.

(10) Patent No.: US 9,792,917 B2
(45) Date of Patent: Oct. 17, 2017

(54) AUDIO PROCESSING DEVICE AND METHOD AND ELECTRO-ACOUSTIC CONVERTING DEVICE AND METHOD

(71) Applicant: KT MICRO, INC., Beijing (CN)

(72) Inventors: Dianyu Chen, Beijing (CN); Yihai Xiang, Beijing (CN); Haiqing Lin, Beijing (CN); Pan Mu, Beijing (CN); Yanqing Wu, Beijing (CN); Hekai Kang, Beijing (CN); Dongfeng Zhou, Beijing (CN); Yuqiang Yuan, Beijing (CN); Wenhui Yuan, Beijing (CN); Jinfeng Wu, Beijing (CN)

(73) Assignee: KT MICRO, INC., Beijing (CN)

( * ) Notice: Subject to any disclaimer, the term of this patent is extended or adjusted under 35 U.S.C. 154(b) by 47 days.

(21) Appl. No.: 14/889,841

(22) PCT Filed: May 8, 2014

(86) PCT No.: PCT/CN2014/077021
§ 371 (c)(1),
(2) Date: Nov. 7, 2015

(87) PCT Pub. No.: WO2014/180317
PCT Pub. Date: Nov. 13, 2014

(65) Prior Publication Data
US 2016/0086610 A1    Mar. 24, 2016

(30) Foreign Application Priority Data

May 9, 2013   (CN) .......................... 2013 1 0170062
Dec. 6, 2013  (CN) ..................... 2013 2 0800119 U (51) Int. Cl.
*H04B 3/00*      (2006.01)
*G10L 19/008*    (2013.01)
(Continued)

(52) U.S. Cl.
CPC .............. *G10L 19/008* (2013.01); *G09B 5/04* (2013.01); *G10H 1/0091* (2013.01); *H04B 1/20* (2013.01);
(Continued)

(58) Field of Classification Search
CPC ....... G10L 19/00; G10L 25/81; G10H 1/0575; G10H 1/08; G10H 7/00; G10H 2210/005; H04H 2201/20; H04N 5/602
(Continued)

(56) References Cited

U.S. PATENT DOCUMENTS

| | | | |
|---|---|---|---|
| 2011/0046954 A1* | 2/2011 | Lin ........................ | H04R 27/00 704/258 |
| 2012/0063617 A1* | 3/2012 | Ramos ............. | G11B 20/00826 381/119 |
| 2013/0315417 A1* | 11/2013 | Christie ................. | H04H 20/86 381/80 |

FOREIGN PATENT DOCUMENTS

| CN | 202455489 U | 9/2012 |
|---|---|---|
| CN | 202551269 U | 11/2012 |

(Continued)

Primary Examiner — William A Jerez Lora
(74) Attorney, Agent, or Firm — Andrew C. Cheng (57) ABSTRACT

The present invention relates to an audio processing device and method, and an electro-acoustic converting device and method. The audio processing device comprises: a first receiving module, configured to receive a first audio signal; a second receiving module, configured to receive a second audio signal; an audio synthesizing module, configured to synthesize the first audio signal and the second audio signal to obtain a third audio signal; and an audio outputting module, configured to output the third audio signal. According to the present invention, when enjoying songs or music or learning languages by using an audio processing device or an audio playing device, a user is capable of hearing his or her own voice while singing or reading, which greatly (Continued)

improves the effects of self-entertainment and language learning.

10 Claims, 4 Drawing Sheets (51) Int. Cl.
*H04B 1/20* (2006.01)
*H04R 29/00* (2006.01)
*G09B 5/04* (2006.01)
*G10H 1/00* (2006.01)

(52) U.S. Cl.
CPC ..... *H04R 29/004* (2013.01); *G10H 2240/211* (2013.01); *H04R 2420/07* (2013.01)

(58) Field of Classification Search
USPC ......... 381/6, 14, 16, 80, 119, 124; 455/3.01, 455/3.06
See application file for complete search history.

(56) References Cited

FOREIGN PATENT DOCUMENTS

| CN | 201310170062.2 | 5/2013 |
| CN | 2013101700622 | 5/2013 |

* cited by examiner

AUDIO PROCESSING DEVICE AND METHOD AND ELECTRO-ACOUSTIC CONVERTING DEVICE AND METHOD

TECHNICAL FIELD

Embodiments of the present invention relate to the field of wireless transmission, and in particular, relate to an audio processing device and method, and an electro-acoustic converting device and method.

BACKGROUND

When people enjoy music by using mobile phones, tablet computers or the like devices, they generally cannot help singing songs while listening to their favorite ones. However, at present, people may only hear the sound of the music, but fail to simultaneously heart their own voice with playing of the music. As a result, the effect of complete self-entertainment may not be achieved. Similarly, this is also the case in language learning. Generally, language learners fail to clearly sense their follow-up or repetition effect during reading, and thus fail to make corrections in real time. Consequently, the learning effect is poor.

Accordingly, if users are capable of hearing the voices during singing and reading when enjoying songs or learning languages, the effects of self-entertainment and language learning would be greatly improved.

SUMMARY

Embodiments of the present invention provides an audio processing device and method, and an electro-acoustic converting device and method, such that when enjoying songs or music or learning languages by using an audio processing device or an audio playing device, a user is capable of hearing his or her own voice while singing or reading, which greatly improves the effects of self-entertainment and language learning.

An embodiment of the present invention provides an audio processing device, comprising:
  a first receiving module, configured to receive a first audio signal;
  a second receiving module, configured to receive a second audio signal;
  an audio synthesizing module, configured to synthesize the first audio signal and the second audio signal to obtain a third audio signal; and
  an audio outputting module, configured to output the third audio signal.

An embodiment of the present invention provides an audio processing method, comprising:
  receiving a first audio signal and a second audio signal;
  synthesizing the first audio signal and the second audio signal to obtain a third audio signal; and
  outputting the third audio signal.

An embodiment of the present invention provides an electro-acoustic converting device, comprising:
  a first receiving module, configured to receive a first audio signal;
  a second receiving module, configured to receive a second audio signal;
  an audio synthesizing module, configured to synthesize the first audio signal and the second audio signal to obtain a third audio signal; and
  an electro-acoustic converting module, configured to convert the third audio signal to a sound.

An embodiment of the present invention provides an electro-acoustic converting method, comprising:
  receiving a first audio signal and a second audio signal;
  synthesizing the first audio signal and the second audio signal to obtain a third audio signal; and
  converting the third audio signal to a sound.

In the embodiments of the present invention, the audio signal processing device mixes the two audio signals from the first audio generating device and the second audio generating device, and the electro-acoustic converting device converts the mixed signal to a sound. As such, when listening to a song or learning a language, a user is capable of simultaneously hearing his or her own voice, which greatly improves the effects of self-entertainment and language learning.

DETAILED DESCRIPTION

Figure 1:
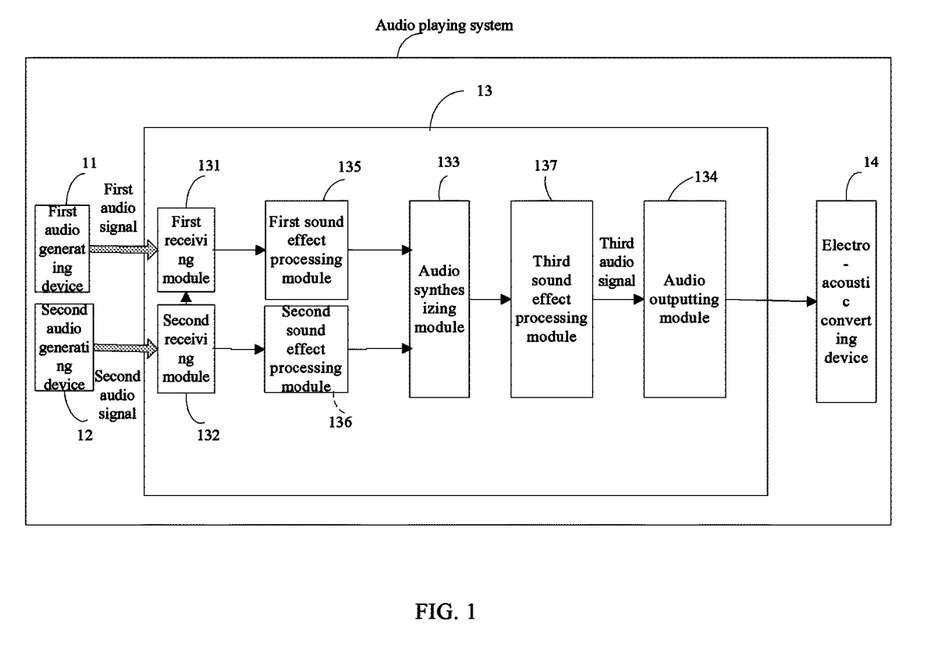
FIG. 1 is a schematic structural diagram illustrating an audio playing system according a first embodiment of the present invention.

The present invention is further described with reference to the drawings and exemplary embodiments. As illustrated in FIG. 1, a schematic structural diagram illustrating an audio playing system according to a first embodiment of the present invention is given. The audio playing system may comprise: a first audio generating device 11, a second audio generating device 12, an audio processing device 13, and an electro-acoustic converting device 14. The audio processing device 13 may comprise: a first receiving module 131, a second receiving module 132, an audio synthesizing module 133, and an audio outputting module 134. The first receiving module 131 is communicatively connected to the first audio generating device 11, the second receiving module 132 is communicatively connected to the second audio generating device 12, and the audio outputting module 134 is communicatively connected to the electro-acoustic converting device 14.

The first audio generating device 11 is configured to generate and output a first audio signal. The second audio generating device 12 is configured to generate and output a second audio signal. The first receiving module 131 is configured to receive the first audio signal. The second receiving module 132 is configured to receive the second audio signal. The audio synthesizing module 133 is configured to synthesize the first audio signal and the second audio signal to obtain a third audio signal. The audio outputting module 134 is configured to output the third audio signal. The electro-acoustic converting device 14 is configured to receive the third audio device, and convert the third audio signal to a sound.

Figure 2:
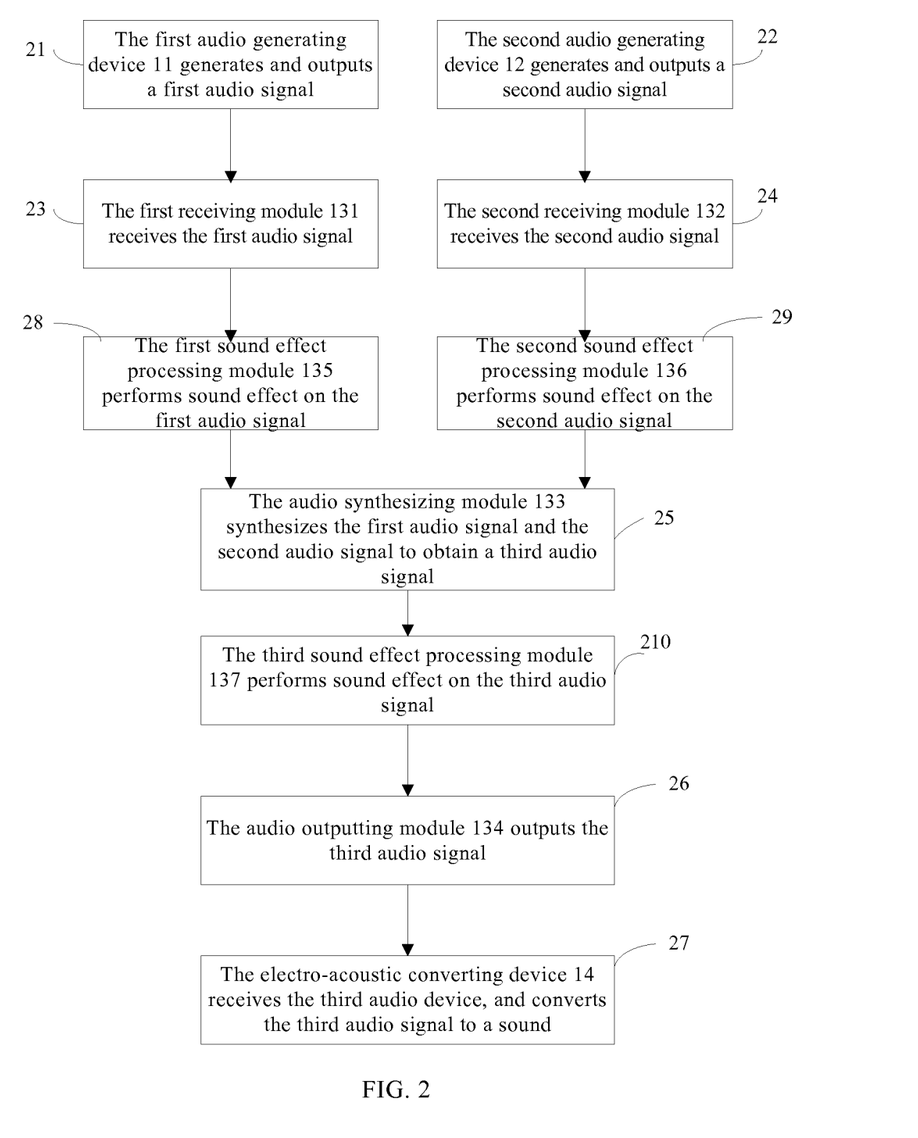
FIG. 2 is a schematic flowchart illustrating an audio playing method according to the first embodiment of the present invention illustrating the audio playing system.

The working principles of the audio processing device are described hereinafter. As illustrated in FIG. 2, a schematic flowchart of schematic flowchart illustrating an audio playing method according to the first embodiment of the present invention illustrating the audio playing system. The method may be applied in the audio playing system as illustrated in FIG. 1, and the method may comprise the following steps:

Step 21: The first audio generating device 11 generates and outputs a first audio signal, and step 23 is performed.

Step 22: The second audio generating device 12 generates and outputs a second audio signal, and step 24 is performed.

Step 23: The first receiving module 131 receives the first audio signal, and step 25 is performed.

Step 24: The second receiving module 132 receives the second audio signal, and step 25 is performed.

Step 25: The audio synthesizing module 133 synthesizes the first audio signal and the second audio signal to obtain a third audio signal, and step 26 is performed.

Step 26: The audio outputting module 134 outputs the third audio signal, and step 27 is performed.

Step 27: The electro-acoustic converting device 14 receives the third audio device, and converts the third audio signal to a sound.

Optionally, the electro-acoustic converting device 14 may be specifically a loudspeaker, an earphone, or the like.

There is no strict time sequence between step 21 and step 22, and there is also no strict time sequence between step 23 and step 24.

In this embodiment, the audio signal processing device 13 mixes the two audio signals from the first audio generating device 11 and the second audio generating device 12, and the electro-acoustic converting device 14 converts the mixed signal to a sound. As such, when listening to a song or learning a language, a user is capable of simultaneously hearing his or her own voice, which greatly improves the effects of self-entertainment and language learning.

Optionally, the first audio generating device 11 may be a microphone, and the first audio signal may be specifically an audio signal collected by the microphone; the second audio generating device 12 may be specifically a mobile phone, a tablet computer, an MP3, a television or the like audio playing device, and the second audio signal may be specifically a background music signal sent by the audio playing device. For example, a background music signal may be generated via an application "Sing Bar" mounted on a mobile phone. Optionally, the number of microphones may be greater than or equal to 2. As such, the number of first audio signals may be greater than 2. The audio processing device 13 may synthesize more than two of the first audio signals and the second audio signals, to accommodate the requirements of using the system by multiple users simultaneously.

Optionally, data may be transmitted between the first receiving module 131 and the first audio generating device 11 by using a wireless communication technology, and/or data may be transmitted between the second receiving module 132 and the second audio generating device 12 by using a wireless communication technology. The first audio generating device 11 transmits the first audio signal by using a radio transmission technology, the first receiving module 131 receives the first audio signal by using a wireless receiving technology; and/or the second audio generating device 12 transmits the second audio signal by using a wireless transmission technology, and the second receiving module 132 receives the second audio signal by using a wireless receiving technology. Optionally, the first receiving module 131 and/or the second receiving module 132 employing the wireless receiving technology may be implemented by using an integrated circuit chip and an external antenna. As such, the audio processing device may be made to a very small size, facilitating carrying and use.

Optionally, the first receiving module 131 may receives the first audio signal from the first audio generating device 11 in a wired manner, and/or the second receiving module 132 may receive the second audio signal from the second audio generating device 12 in a wired manner. For example, data transmission may be performed by using a USB interface or an audio interface.

Optionally, the audio outputting module 134 may outputs the third audio signal in a wireless manner or a wired manner. In other words, the audio outputting module 134 and the electro-acoustic converting device 14 may be connected to each other in a wired manner or a wireless manner.

Data transmission by using the wireless communication technology may reduce the connection lines, and therefore is convenient in use. Data transmission in a wired manner has the advantages of no delay, less interference, and high signal quality.

Optionally, when the first receiving module 131 receives some audio signals by using the wireless receiving technology, for example, when the first receiving module 131 receives a voice signal sent by a microphone, a delay of the wireless receiving technology employed by the first receiving module 131 is less than a first predetermined threshold. The less the first predetermined threshold, the higher the quality of the transmitted audio signal. Optionally, when the audio outputting module 134 outputs the third audio signal in a wired manner, the first predetermined threshold is less than or equal to 20 ms; when the audio outputting module 134 outputs the third audio signal by using the wireless communication technology, a delay of the wireless communication technology employed by the audio outputting module 134 is less than a second predetermined threshold. In this case, a sum of the first predetermined threshold and the second predetermined threshold is less than or equal to 50 ms. As such, users almost cannot distinguish the audio source and the delayed audio, and thus may acquire better user experience.

Optionally, the analog communication technology has the characteristic of short delay. To reduce the delay, the first receiving module 131 may employ the analog communication technology as the wireless receiving technology. Particularly, when the first receiving module 131 receives the voice signal sent by the microphone, the first receiving module 131 receives the audio signal by using the analog communication technology, which may greatly reduce the delay of the audio signal.

When the second receiving module 132 receives some of the second audio signals, for example, receives the background music signal sent by the audio playing device, lower requirements are imposed on the delay, and higher requirements are imposed on the quality of the music. However, the digital communication technology has the characteristic of good transmission quality, and therefore the second receiving module 132 may receive the second audio signal by using the digital communication receiving technology. Optionally, the digital communication receiving technology may be specifically Bluetooth, WLAN, 2.4 GHz wireless receiving technology, and 5.8 GHz wireless receiving technology. The 2.4 GHz wireless receiving technology employs 2.4 GHz industry science medicine (hereinafter abbreviated as ISM) frequency to receive signals; and the 5.8 GHz wireless receiving technology employs 5.8 GHz ISM frequency to receive signals.

Optionally, since voice compress-expand is an audio technology for suppressing voice and improving voice quality in wireless transmission and receiving. At the transmitting end, the voice signals to be transmitted is effectively compressed, which reduces the difference of amplitude between a high signal level and a low signal level, such that all the signals are pulled on the higher level for modulation, and the transmitted to the receiving end. At the receiving end, the received signals are expanded, such that the amplitudes of the signals at the low level and the high level are recovered to its original state. In this embodiment, the first receiving module 131 may also expand a dynamic range of the received first audio signal.

Optionally, referring to the schematic structural diagram as illustrated in FIG. 1, the audio processing device 13 may further comprise at least one of a first sound effect processing module 135, a second sound effect processing module 136, and a third sound effect processing module 137. The first sound effect processing module 135 is connected between the first receiving module 131 and the audio synthesizing module 133. The second sound effect processing module 136 is connected between the second receiving module 132 and the audio synthesizing module 133. The third sound effect processing module 137 is connected between the audio synthesizing module 133 and the audio outputting module 134. The first audio processing module 135 is configured to perform sound effect processing on the first audio signal; the second sound effect processing module 136 is configured to perform sound effect on the second audio signal; and the third sound effect processing module 137 is configured to perform sound effect on the third audio signal. Correspondingly, referring to the schematic flowchart as illustrated in FIG. 2, the audio playing method may further comprise at least one of the following steps:

Step 28: The first sound effect processing module 135 performs sound effect on the first audio signal.

Step 29: The second sound effect processing module 136 performs sound effect on the second audio signal.

Step 210: The third sound effect processing module 137 performs sound effect on the third audio signal.

Step 28 is performed between step 23 and step 25, step 29 is performed between step 24 and step 25, and step 210 is performed between step 25 and step 26. The sound effect processing may be specifically reverberation, equilibrium, noise reduction or the like processing that is capable of improving the voice quality.

Hereinafter two examples of the audio processing device are listed for further acknowledgment of the specific morphology of the audio processing device 13.

The first example is as follows: The first receiving module 131 receives the first audio signal in a wireless manner, the second receiving module 132 receives the second audio signal in a wired manner, and the audio outputting module 134 outputs the third audio signal in a wireless manner. For example, the first receiving module 131 receives the audio signal sent by the microphone by using FM communication technology; the second receiving module 132 receives the background music signal sent by the audio playing device by using a USB interface, an audio interface or the like; the audio outputting module 134 sends the third audio signal to the electro-acoustic converting device 14 by using Bluetooth communication technology. As such, a sound formed by mixing the voice and the background music is finally heard.

The second example is as follows: The first receiving module 131 receives the first audio signal by using FM communication technology, the second receiving module 132 receives the second audio signal by using Bluetooth communication technology, and the audio outputting module 134 outputs the third audio signal by using an audio interface. For example, the first receiving module 131 receives the audio signal sent by the microphone by using FM communication technology; the second receiving module 132 receives the background music signal sent by the audio playing device by using Bluetooth; and the audio outputting module 134 sends the third audio signal to the electro-acoustic converting device 14 by using an audio interface.

Figure 3:
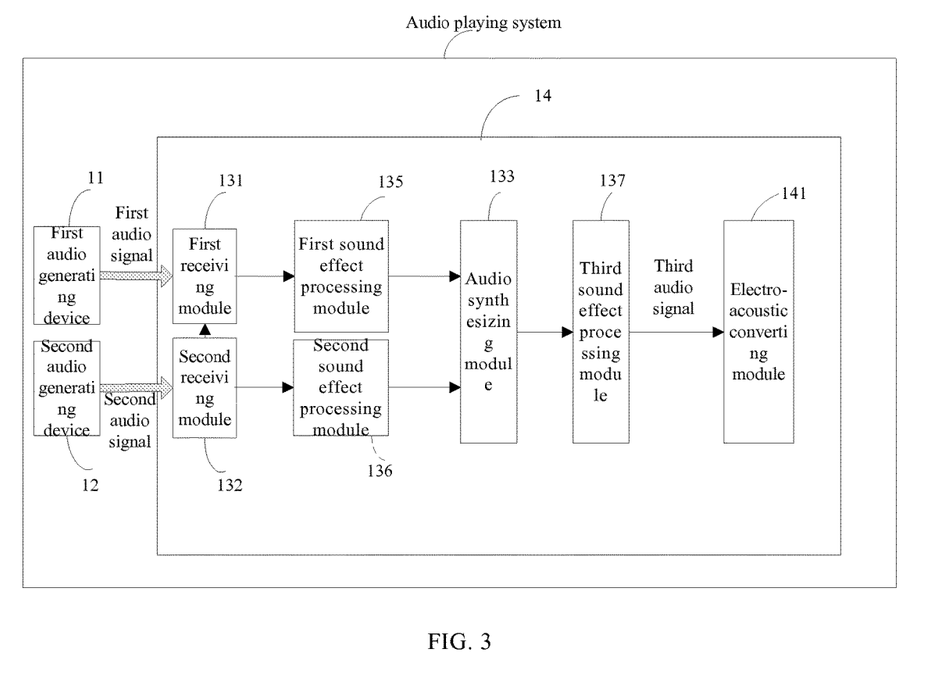
FIG. 3 is a schematic structural diagram illustrating an audio playing system according a second embodiment of the present invention.

As illustrated in FIG. 3, a schematic structural diagram illustrating an audio playing system according to a second embodiment of the present invention is given. The audio playing system may comprise: a first audio generating device 11, a second audio generating device 12, and an electro-acoustic converting device 14. The electro-acoustic converting device 14 may comprise: a first receiving module 131, a second receiving module 132, an audio synthesizing module 133, and an electro-acoustic converting module 141. The first receiving module 131 is communicatively connected to the first audio generating device 11, the second receiving module 132 is communicatively connected to the second audio generating device 12, the audio synthesizing module 133 is connected to the first receiving module 131 and the second receiving module 132, and the audio synthesizing module 133 is connected to the electro-acoustic converting module 141. The first receiving module 131 is configured to receive a first audio signal; the second receiving module 132 is configured to receive a second audio signal; the audio synthesizing module 133 is configured to synthesize the first audio signal and the second audio signal to obtain a third audio signal; and the electro-acoustic converting module 141 is configured to convert the third audio signal into a sound.

Figure 4:
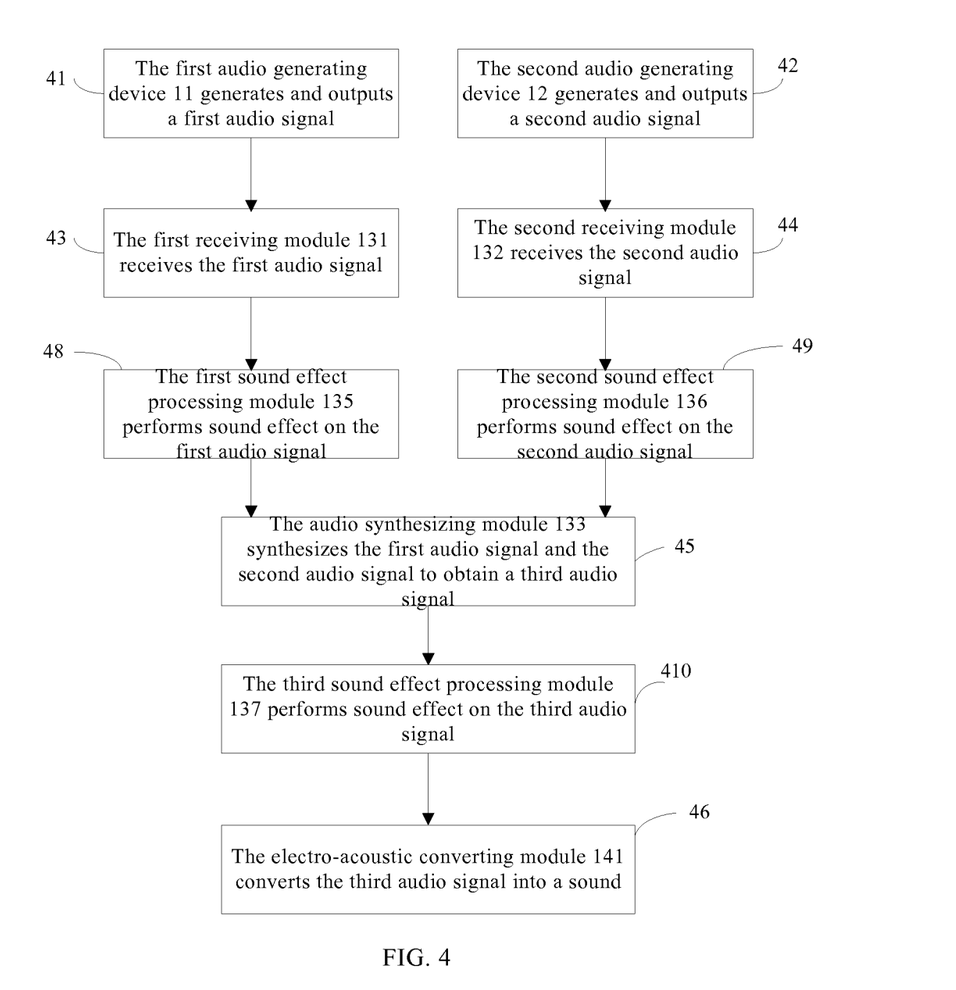
FIG. 4 is a schematic flowchart illustrating an audio playing method according the second embodiment of the present invention illustrating the audio playing system.

As illustrated in FIG. 4, a schematic flowchart of schematic flowchart illustrating an audio playing method according to the second embodiment of the present invention illustrating the audio playing system. The method may be applied in the audio playing system as illustrated in FIG. 3, and the method may comprise the following steps:

Step 41: The first audio generating device 11 generates and outputs a first audio signal, and step 43 is performed.

Step 42: The second audio generating device 12 generates and outputs a second audio signal, and step 44 is performed.

Step 43: The first receiving module 131 receives the first audio signal, and step 45 is performed.

Step 44: The second receiving module 132 receives the second audio signal, and step 45 is performed.

Step 45: The audio synthesizing module 133 synthesizes the first audio signal and the second audio signal to obtain a third audio signal, and step 46 is performed.

Step 46: The electro-acoustic converting module 141 converts the third audio signal into a sound.

There is no strict time sequence between step 41 and step 42, and there is also no strict time sequence between step 43 and step 44.

In this embodiment, the electro-acoustic converting device 14 mixes the two audio signals from the first audio generating device 11 and the second audio generating device 12, and converts the mixed signal to a sound. As such, when listening to a song or learning a language, a user is capable of simultaneously hearing his or her own voice, which greatly improves the effects of self-entertainment and language learning.

Different from the above embodiment, in this embodiment, synthesis and electro-acoustic conversion of the audio signal are performed in one device, i.e., the electro-acoustic converting device 14; whereas in the above embodiment, synthesis and electro-acoustic conversion of the audio signal are respectively performed in two independent devices, i.e., the audio processing device 13 and the electro-acoustic converting device 14.

Optionally, the first audio generating device 11 may be a microphone, and the first audio signal may be specifically an audio signal collected by the microphone; the second audio generating device 12 may be specifically a mobile phone, a tablet computer, an MP3, a television or the like audio playing device, and the second audio signal may be specifically a background music signal sent by the audio playing device. For example, a background music signal may be generated via an application "Sing Bar" mounted on a mobile phone. Optionally, the number of microphones may be greater than or equal to 2. As such, the number of first audio signals may be greater than 2. The electro-acoustic converting device 14 may synthesize more than two of the first audio signals and the second audio signals, to accommodate the requirements of using the system by multiple users simultaneously.

Optionally, data may be transmitted between the first receiving module 131 and the first audio generating device 11 by using a wireless communication technology, and/or data may be transmitted between the second receiving module 132 and the second audio generating device 12 by using a wireless communication technology. The first audio generating device 11 transmits the first audio signal by using a radio transmission technology, the first receiving module 131 receives the first audio signal by using a wireless receiving technology; and/or the second audio generating device 12 transmits the second audio signal by using a wireless transmission technology, and the second receiving module 132 receives the second audio signal by using a wireless receiving technology. Optionally, the first receiving module 131 and/or the second receiving module 132 employing the wireless receiving technology may be implemented by using an integrated circuit chip. As such, the audio processing device may be made to a very small size, facilitating carrying and use.

Optionally, the first receiving module 131 may receives the first audio signal from the first audio generating device 11 in a wired manner, and/or the second receiving module 132 may receive the second audio signal from the second audio generating device 12 in a wired manner. For example, data transmission may be performed by using a USB interface or an audio interface.

Data transmission by using the wireless communication technology may reduce the connection lines, and therefore is convenient in use. Data transmission in a wired manner has the advantages of no delay, less interference, and high signal quality.

Optionally, when the first receiving module 131 receives some audio signals by using the wireless receiving technology, for example, when the first receiving module 131 receives a voice signal sent by a microphone, a delay of the wireless receiving technology employed by the first receiving module 131 is less than a first predetermined threshold. The less the first predetermined threshold, the higher the quality of the transmitted audio signal. For example, when the first predetermined threshold is less than or equal to 50 ms, users almost cannot distinguish the audio source and the delayed audio, and thus may acquire better user experience.

Optionally, the analog communication technology has the characteristic of short delay. To reduce the delay, the first receiving module 131 may employ the analog communication technology as the wireless receiving technology. Particularly, when the first receiving module 131 receives the voice signal sent by the microphone, the first receiving module 131 receives the audio signal by using the analog communication technology, which may greatly reduce the delay of the audio signal. When the second receiving module 132 receives some of the second audio signals, for example, receives the background music signal sent by the audio playing device, lower requirements are imposed on the delay, and higher requirements are imposed on the quality of the music. However, the digital communication technology has the characteristic of good transmission quality, and therefore the second receiving module 132 may receive the second audio signal by using the digital communication receiving technology. Optionally, the digital communication receiving technology may be specifically Bluetooth, WLAN, 2.4 GHz wireless receiving technology, and 5.8 GHz wireless receiving technology; and the analog communication receiving technology may be specifically FM receiving technology.

Optionally, since voice compress-expand is an audio technology for suppressing voice and improving voice quality in wireless transmission and receiving. At the transmitting end, the voice signals to be transmitted is effectively compressed, which reduces the difference of amplitude between a high signal level and a low signal level, such that all the signals are pulled on the higher level for modulation, and the transmitted to the receiving end. At the receiving end, the received signals are expanded, such that the amplitudes of the signals at the low level and the high level are recovered to its original state. In this embodiment, the first receiving module 131 may also expand a dynamic range of the received first audio signal.

Optionally, referring to the schematic structural diagram as illustrated in FIG. 3, the electro-acoustic converting device 14 may further comprise at least one of a first sound effect processing module 135, a second sound effect processing module 136, and a third sound effect processing module 137. The first sound effect processing module 135 is connected between the first receiving module 131 and the audio synthesizing module 133. The second sound effect processing module 136 is connected between the second receiving module 132 and the audio synthesizing module 133. The third sound effect processing module 137 is connected between the audio synthesizing module 133 and the electro-acoustic converting module 141. The first audio processing module 135 is configured to perform sound effect processing on the first audio signal; the second sound effect processing module 136 is configured to perform sound effect on the second audio signal; and the third sound effect processing module 137 is configured to perform sound effect on the third audio signal. Correspondingly, referring to the schematic flowchart as illustrated in FIG. 4, the audio playing method may further comprise at least one of the following steps:

Step 48: The first sound effect processing module 135 performs sound effect on the first audio signal.

Step 49: The second sound effect processing module 136 performs sound effect on the second audio signal.

Step 410: The third sound effect processing module 137 performs sound effect on the third audio signal.

Step 48 is performed between step 43 and step 45, step 49 is performed between step 44 and step 45, and step 410 is performed between step 45 and step 46. The sound effect processing may be specifically reverberation, equilibrium, noise reduction or the like processing that is capable of improving the voice quality.

It should be finally noted that the above embodiments are merely for illustrating the technical solution of the present invention instead of limiting the technical solution of the present invention. Although the present invention is described in detail with reference to preferable embodiments, persons of ordinary skill in the art shall understand that various modifications or equivalent replacements made to the technical solution of the present invention without departing from the spirit and scope of the present invention shall all covered within the scope of the present invention.

What is claimed is:

1. An audio processing device, comprising:
a first receiving module, configured to receive a first audio signal;
a second receiving module, configured to receive a second audio signal;
an audio synthesizing module, configured to synthesize the first audio signal and the second audio signal to obtain a third audio signal; and
an audio outputting module, configured to output the third audio signal;
wherein the first receiving module receives the first audio signal by using a wireless receiving technology; and/or the second receiving module receives the second audio signal by using a wireless receiving technology;
wherein a delay of the wireless receiving technology employed by the first receiving module is less than a first predetermined threshold;
wherein the audio outputting module outputs the third audio signal by using a wireless communication technology;
wherein a delay of the wireless communication technology employed by the audio outputting module is less than a second predetermined threshold;
wherein a sum of the first predetermined threshold and the second predetermined threshold is less than or equal to 50 ms; and
wherein the wireless receiving technology employed by the first receiving module is an analog communication receiving technology, and the wireless receiving technology employed by the second receiving module is a digital communication receiving technology.

2. The device according to claim 1, wherein the first audio signal is a voice signal sent by a microphone, and the second audio signal is a background music signal sent by an audio player.

3. The device according to claim 1, wherein the audio outputting module outputs the third audio signal in a wired manner or a wireless manner.

4. The device according to claim 1, wherein the first predetermined threshold is less than or equal to 50 ms.

5. The device according to claim 1, wherein the first receiving module receives the first audio signal by using FM communication technology, the second receiving module receives the second audio signal by using BLUETOOTH® receiving technology, and the audio outputting module outputs the third audio signal by using an audio interface.

6. An audio processing method, comprising:
receiving a first audio signal and a second audio signal;
synthesizing the first audio signal and the second audio signal to obtain a third audio signal; and
outputting the third audio signal;
wherein the receiving a first audio signal and a second audio signal comprises: receiving the first audio signal and/or the second audio signal by using a wireless receiving technology;
wherein a delay of the wireless receiving technology employed for receiving the first audio signal is less than a first predetermined threshold;
wherein the outputting the third audio signal comprises: outputting the third audio signal in a wireless manner;
wherein a delay of the wireless communication technology employed for receiving the third audio signal is less than a second predetermined threshold;
wherein a sum of the first predetermined threshold and the second predetermined threshold is less than or equal to 50 ms; and
wherein the wireless receiving technology employed for receiving the first audio signal is an analog communication receiving technology.

7. The method according to claim 6, wherein the first audio signal is a voice signal sent by a microphone, and the second audio signal is a background music signal sent by an audio player.

8. The method according to claim 6, wherein the outputting the third audio signal comprises: outputting the third audio signal in a wired manner or a wireless manner.

9. The method according to claim 6, wherein the first predetermined threshold is less than or equal to 50 ms.

10. The method according to claim 6, wherein the receiving a first audio signal and a second audio signal comprises: receiving the first audio signal by using FM communication technology, and receiving the second audio signal by using BLUETOOTH® technology; and
the outputting the third audio signal comprises: outputting the third audio signal by using an audio interface.

* * * * *